(12) United States Patent
Kozar et al.

(10) Patent No.: US 9,809,109 B2
(45) Date of Patent: Nov. 7, 2017

(54) BALLOONING SELF-SEALING BLADDERS

(71) Applicant: The Boeing Company, Chicago, IL (US)

(72) Inventors: Michael P. Kozar, Mercer Island, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 14/843,571

(22) Filed: Sep. 2, 2015

(65) Prior Publication Data

US 2017/0057342 A1  Mar. 2, 2017

(51) Int. Cl.
*B60K 15/03* (2006.01)

(52) U.S. Cl.
CPC ........ *B60K 15/03177* (2013.01); *B60K 15/03* (2013.01); *B60K 2015/03085* (2013.01); *B60K 2015/03407* (2013.01); *B60K 2015/03447* (2013.01)

(58) Field of Classification Search
CPC ...... B65D 21/086; B65D 21/00; B65D 21/08; B60K 2015/03407; B60K 2015/03447; B60K 2015/03085; B60K 15/03
USPC ........................................ 220/560.02, 560.01
See application file for complete search history.

(56) References Cited

U.S. PATENT DOCUMENTS

| | | |
|---|---|---|
| 1,386,791 A | 8/1921 | Murdock |
| 1,406,667 A | 2/1922 | Macbeth |
| 1,463,498 A | 7/1923 | Burgess |
| 2,395,556 A | 2/1946 | Kopplin |
| 2,406,679 A | 8/1946 | Gray et al. |
| 2,416,231 A | 2/1947 | Smith et al. |
| 2,421,613 A | 6/1947 | DeWeese |
| 2,422,797 A | 6/1947 | Pfleumer |
| 2,425,514 A | 8/1947 | Dasher et al. |
| 2,439,562 A | 4/1948 | Cunningham |
| 2,438,965 A | 6/1948 | Dasher |
| 2,446,815 A | 8/1948 | Davies |
| 2,451,911 A | 10/1948 | Braden |
| 2,626,882 A | 1/1953 | Gerke |
| 2,715,085 A | 8/1955 | Boger |
| 3,379,336 A | 4/1968 | Stedfeld |
| 3,431,818 A | 3/1969 | King |
| 3,509,016 A | 4/1970 | Wickersham et al. |
| 3,563,846 A | 2/1971 | Harr |
| 3,654,057 A | 4/1972 | Olevitch |
| 3,664,904 A | 5/1972 | Cook |
| 3,698,587 A | 10/1972 | Baker et al. |
| 3,801,425 A | 4/1974 | Cook |
| 3,949,894 A | 4/1976 | Underwood |
| 3,980,106 A | 9/1976 | Wiggins |
| 4,088,240 A | 5/1978 | San Miguel |
| 4,115,616 A | 9/1978 | Heitz et al. |
| 4,216,803 A | 8/1980 | Hall |
| 4,336,291 A | 6/1982 | Broadhurst et al. |
| 4,422,561 A | 12/1983 | Grosvenor et al. |
| 4,925,057 A | 5/1990 | Childress et al. |
| 5,383,567 A | 1/1995 | Sorathia et al. |
| 7,381,287 B2 | 6/2008 | Monk et al. |

(Continued)

*Primary Examiner* — Stephen Castellano
(74) *Attorney, Agent, or Firm* — McDonnell Boehnen Hulbert & Berghoff LLP

(57) ABSTRACT

A self-sealing liquid bladder having a wall including plurality of connected cells each cell having an elastic wall portion and a stiffened wall portion and at least one source of pressure associated with one or more of the plurality of cells.

26 Claims, 4 Drawing Sheets

(56) References Cited

U.S. PATENT DOCUMENTS

| | | |
|---|---|---|
| 7,393,572 B1 | 7/2008 | Monk et al. |
| 7,794,808 B2 | 9/2010 | Dudt et al. |
| 7,861,844 B2 | 1/2011 | Hayduchok et al. |
| 7,900,333 B2 | 3/2011 | Tweet et al. |
| 8,043,676 B2 | 10/2011 | Ohnstad et al. |
| 8,505,761 B2 | 8/2013 | Tweet et al. |
| 8,685,513 B1 | 4/2014 | Dry |
| 8,777,158 B2 | 7/2014 | Erickson |
| 8,985,380 B2 | 3/2015 | Cook |
| 2004/0065456 A1 | 4/2004 | Belli et al. |
| 2007/0009694 A1 | 1/2007 | Monk et al. |
| 2008/0264951 A1 | 10/2008 | Tweet et al. |
| 2010/0187236 A1 | 7/2010 | Le Rossignot et al. |
| 2011/0186580 A1 | 8/2011 | Joh et al. |
| 2011/0253726 A1 | 10/2011 | Monk et al. |
| 2012/0055937 A1 | 3/2012 | Monk et al. |
| 2012/0058348 A1 | 3/2012 | Monk et al. |
| 2012/0058700 A1 | 3/2012 | Ohnstad et al. |
| 2012/0181207 A1 | 7/2012 | Cook |
| 2013/0140046 A1 | 6/2013 | Monk et al. |
| 2013/0256315 A1 | 10/2013 | Bongiovanni |
| 2015/0151630 A1 | 6/2015 | Bethea |
| 2015/0291332 A1 | 10/2015 | Misciagna |
| 2016/0347038 A1 | 12/2016 | Childress et al. |
| 2017/0057341 A1 | 3/2017 | Wilenski et al. |
| 2017/0057343 A1 | 3/2017 | Kozar et al. |
| 2017/0057344 A1 | 3/2017 | Kozar et al. |
| 2017/0057345 A1 | 3/2017 | Wilenski et al. |

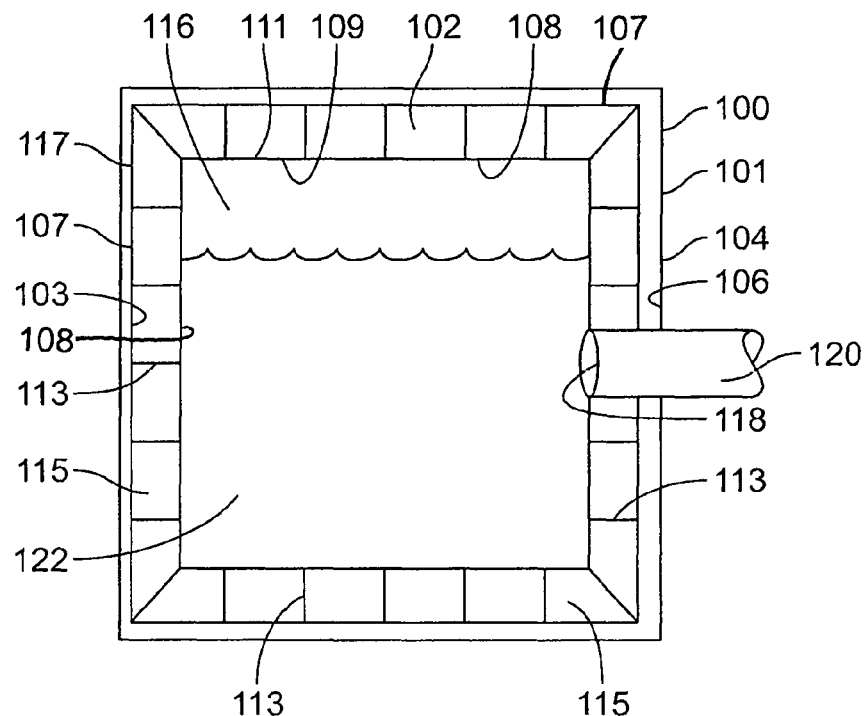
FIG. 1
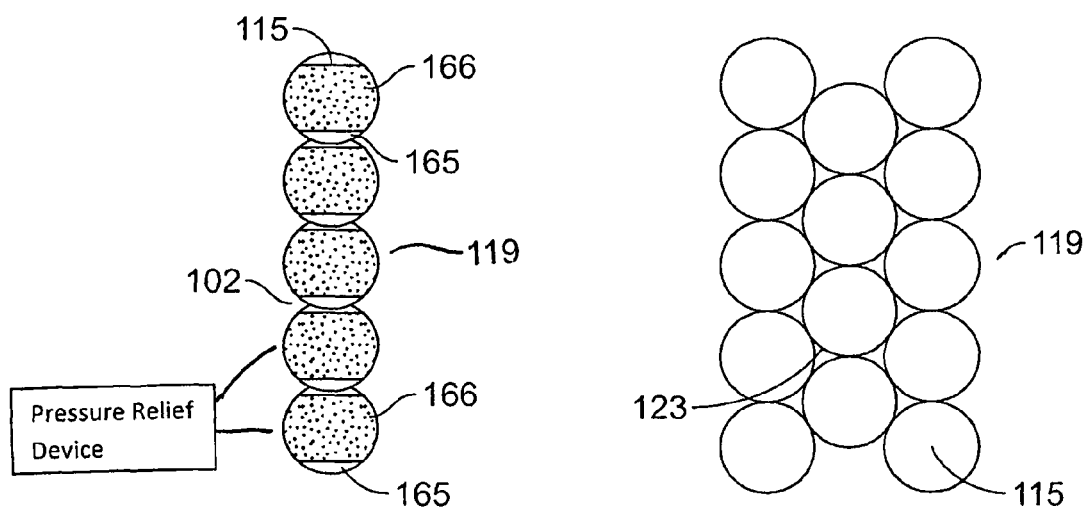
FIG. 2A  FIG. 2B

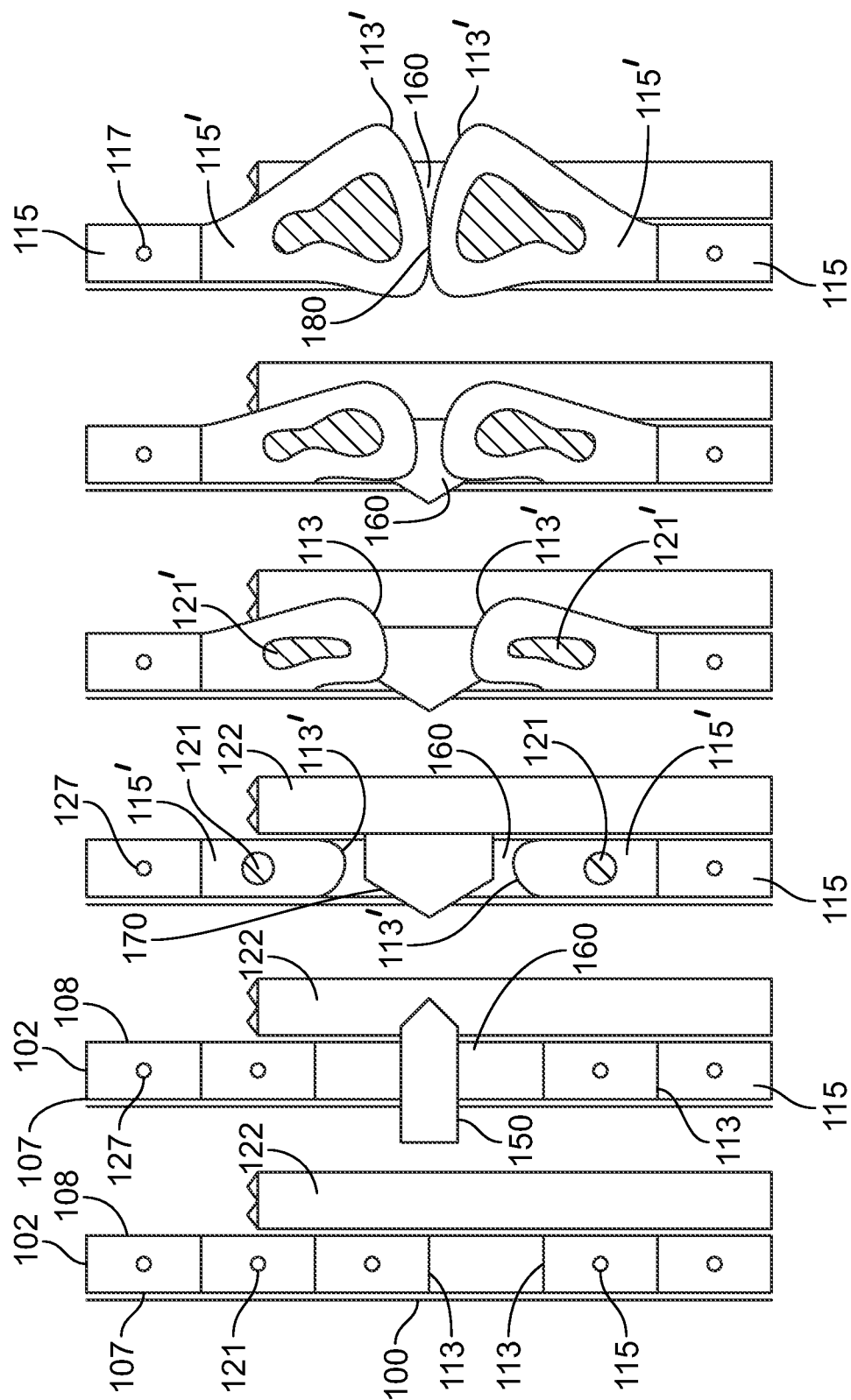

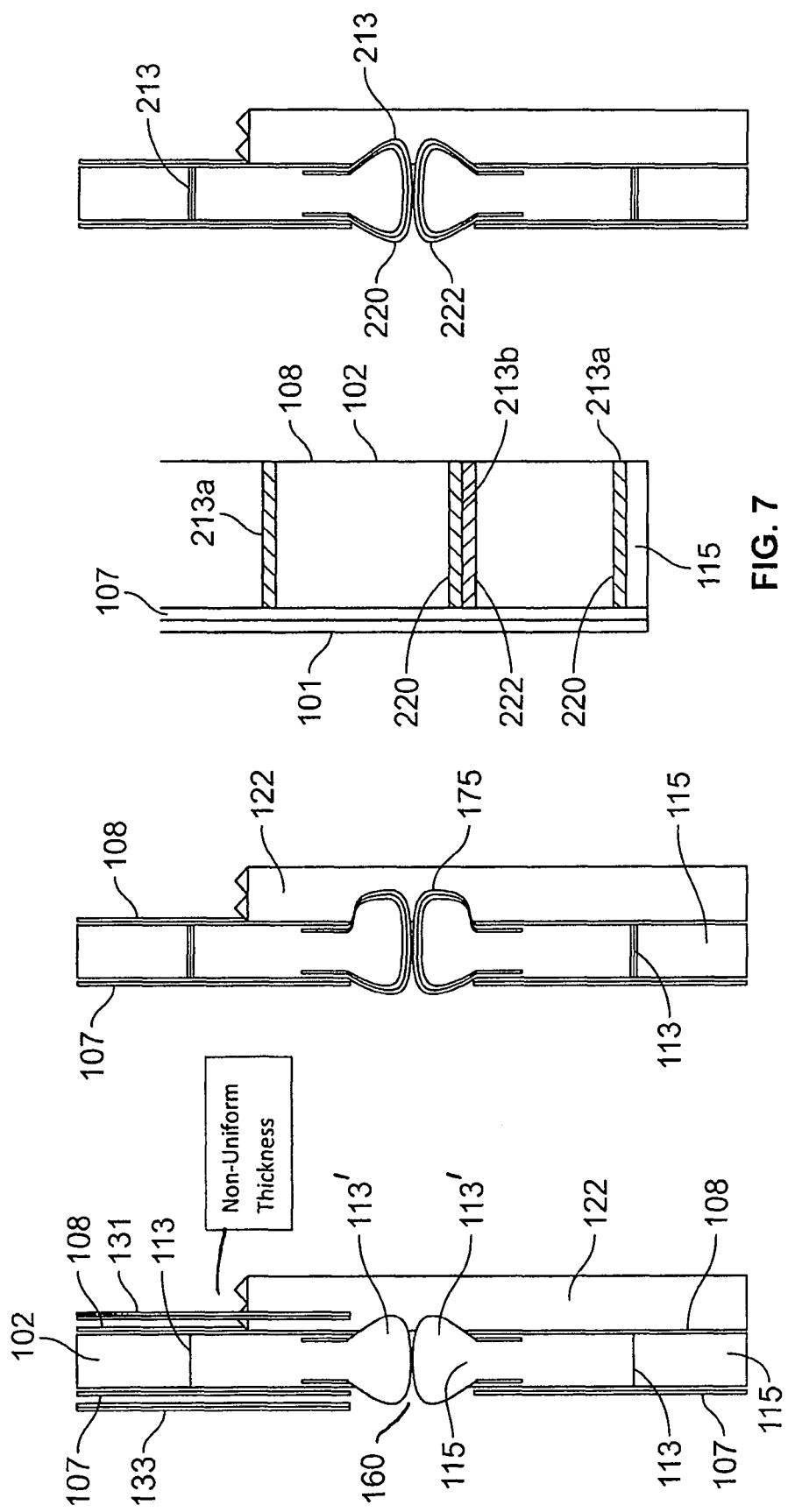

US 9,809,109 B2

BALLOONING SELF-SEALING BLADDERS

BACKGROUND OF THE INVENTION (1) Field of the Invention

This invention relates to fuel bladders that include a plurality of cells each cell including an elastic wall portion that distends to seal punctures that form in the bladder wall.

(2) Description of the Art

Containers are routinely used to hold hazardous and non-hazardous liquids such as hydrocarbons (fuels such as gasoline and kerosene, LPG, crude oil, petrochemicals and the like), liquid hazardous wastes, aqueous acidic and caustic materials, industrial feedstocks, foodstuffs such as milk and oils, and a wide variety of additional liquid materials. Such containers often include inert material bladders inside the container to contain the liquid and to prevent the liquid from contacting the container walls which might be liquid permeable or which might react with the liquid held in the container. The liquid bladders also ensure that leaks are prevented in the event the outer container is breached by a perforation, by corrosion or by any other mechanism.

Liquid holding containers that include bladders can both be simultaneously perforated in which case the liquid in the bladder is able to leak out of the bladder and the container through the hole or wound. Some containers employ features to minimize liquid leakage in the event a container is damaged. Minimizing liquid leakage can be especially important with fuel holding containers such as fuel tanks where holes or wounds can allow fuel leakage that can swiftly reduce the amount of fuel available to power the vehicle. Such fuel leaks can result in a financial loss of valuable fuel, in environmental contamination, in a risk of fire, or in a total vehicle loss.

Military vehicles (e.g., military aircraft, tanks, trucks and the like) are especially vulnerable to fuel tank damage such as damage during combat as a result of being hit by ballistic threats—small arms fire, projectile weapons, shrapnel and/or other similar devices. Such damage can include holes, wounds, punctures, tears, piercings, perforations etc. in the vehicle, with those affecting the fuel tank being particularly problematic. Accordingly, many vehicles, military or otherwise, utilize self-sealing fuel tanks to minimize such risks when the fuel tank is perforated. Conventional self-sealing fuel tanks use a thick layer of natural rubber in the center of a bladder wall. When the tank and self-sealing bladder are punctured, fuel from the tank interacts with the natural rubber of the bladder, and the fuel causes the rubber to swell to an extent that the hole is effectively sealed, thereby preventing further fuel leakage. However, the natural rubber can take a significant amount of time (e.g., 2 minutes or more) to swell enough (by absorbing the leaking fuel) to seal the penetration. In addition, larger caliber penetrations are not easily sealed by natural rubber sealants. Furthermore, conventional self-sealing fuel tank bladders can be stiff, heavy, and difficult and expensive to install. Therefore, there is need for improved self-sealing bladders.

SUMMARY OF THE INVENTION

The presently disclosed self sealing bladders may be used in any fluid holding container in order to reduce and/or essentially stop fluid leaks caused by damage (e.g., a perforation) to the bladder/container. For example, the self-sealing bladders may be placed within a fuel tank to automatically reduce the size of and/or essentially seal any punctures suffered by the fuel tank. The self-sealing effect may be rapid in some examples, may be capable of sealing larger caliber penetrations than can conventional self-sealing bladders, may be lighter and easier to install than conventional self-sealing bladders, and/or may be more flexible than conventional self-sealing bladders.

In one aspect, this disclosure relates to a self-sealing liquid bladder comprising a liquid bladder having a bladder wall structure that is impermeable to a liquid in the bladder, and that includes a plurality of connected cells each cell having an elastic wall portion and a stiffened wall portion; and at least one source of pressure associated with one or more of the plurality of cells wherein the perforation of a cell causes the at least one source of pressure to urge the elastic wall portion of cells adjacent to the perforated cell to expand towards the perforated cell.

In another aspect, this disclosure relates to method for using sealing a bladder hole comprising the steps of: filling a bladder with liquid wherein the bladder includes a bladder wall structure that is impermeable to a liquid in the bladder, and that includes a plurality of connected cells each cell having an elastic wall portion and a stiffened wall portion and at least one source of pressure associated with one or more of the plurality of cells; and forming a hole in the bladder that disrupts at least one of the plurality of connected cells, the cell disruption activating the pressure source of at least one cell adjacent to the disrupted cell to urge the elastic wall portion of the at least one cell to expand towards the hole.

BRIEF DESCRIPTION OF THE DRAWINGS

FIG. 1 is a schematic representation of a container for holding a fluid that includes a self-sealing bladder according to the present disclosure;

FIG. 2A and FIG. 2B are a side view and front views respectively of a bladder wall structure made from a plurality of connected cells;

FIGS. 4A-4F are a sequence of schematic representations of a self-sealing bladder of this invention being breached to form a hole and thereafter self-sealing the hole where each step is shown as a side-cutaway view of the bladder;

FIG. 5 and FIG. 6 are side cut-away views of bladder wall structures that include stiffened wall portions; and FIG. 7 and FIG. 8 are side cutaway views of bladder wall structures including sealing material containing partition walls.

DESCRIPTION OF CURRENT EMBODIMENTS

Figure 3A:
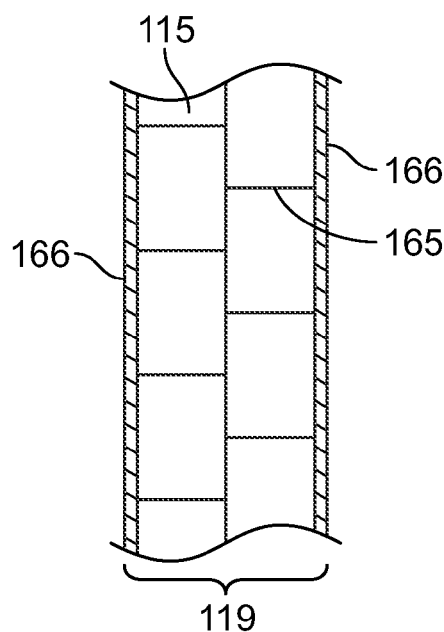
FIGS. 3A-3D are side views of exemplary bladder wall structure configurations.

Self-sealing liquid bladders and related methods are disclosed herein. The self-sealing liquid bladders may be used to reduce loss of a fluid from a container when the container is perforated, such as by being used in a fuel tank of an aircraft or other large apparatus. Presently disclosed self-sealing liquid bladders may provide faster plugging/sealing of punctures/holes/perforations in the bladder walls caused by penetrating objects in comparison to prior art self-sealing tanks, may be able to seal larger wounds than prior art self-sealing tanks, may be easier to install than prior art devices, may be more flexible than prior art devices, may be lighter than prior art devices, may have a thinner bladder wall than prior art devices, and/or may enable the cavity or container in which the self-sealing bladder is placed to hold more fuel than if a prior art device is used.

Self-sealing bladders that are described herein have a multitude of possible uses. The self-sealing bladders may be used in bladder holding containers of any sort that are used to store, transport, supply etc., hazardous and non-hazardous liquids such as hydrocarbons (fuels such as gasoline and kerosene, LPG, crude oil, petrochemicals and the like), liquid hazardous waste, aqueous acidic and caustic materials, industrial feedstocks, water, foodstuffs such as milk and oils, and a wide variety of additional liquid materials.

Self-sealing liquid bladders may be used in conjunction with containers including, but not limited to drums, barrels, storage tanks, fuel tanks, wheeled tanks, railroad tank cars, liquid storage and liquid feed vessels and any similar containers. Self-sealing bladders may be particularly useful when installed in fuel tanks and in particular aircraft fuel tanks and/or military vehicle fuel tanks because these types of fuel tanks are prone to perforation by military projectile weapons and ordinance and/or because fuel loss from these types of fuel containers can have catastrophic consequences. However, the self-sealing bladders can be useful in conventional fuel tanks such as those found in watercraft, land vehicles, spacecraft, automobiles, motorcycles, trucks, construction equipment, buses, and other like fuel propelled vehicles.

Self-sealing bladders can be used in association with containers such as tanks having a wide range of volumes. For example, the bladders can have a liquid volume of as little as 1 L or as great as 100,000 L or even much larger. For very large tanks and containers, multiple bladders can be placed in a container and interconnected with conduits to provide the necessary fluid volume.

Turning now to FIG. 1 there is shown a schematic of a container (100) including one embodiment of a self-sealing bladder (102). Container (100) includes a wall (101) having an exterior surface (104) and an opposing interior surface (106). Self-sealing bladder (102) includes a first wall (108) having an outer surface (109) and an inner surface (111) that can contact and that can be compatible with (inert to) the liquid held in the bladder. Self-sealing bladder (102) further includes a second wall (107) having an inner surface (113) and an outer surface (117) where second wall (107) is spaced apart from first wall (108) by a plurality of elastic partition walls (113), the combination of the first wall (108) second wall (107) and plurality of elastic partition walls (113) forming a bladder wall structure having a plurality of cells (115) each cell defining a cell volume. In addition at least one of the cells (115) includes a source of pressure that is responsive to a bladder perforating event.

Container (100) defines a volume (116) which can be occupied by the fluid filled self-sealing bladder (102). Container (100) typically includes one or more openings (118) though which a conduit (120) associated with self-sealing bladder (102) can pass. The conduit (120) may be used to direct liquid (122) into or out of the self-sealing bladder (102). Multiple conduits can be associated with the self-sealing bladder (102) and another separate conduit can be used to withdraw liquid (122) from self-sealing bladder (102).

The bladder wall structure may be associated with or integrated into bladder (102) in any orientation or manner that provides the bladder with substantial sealing protection. The term "substantial sealing protection" refers to an arrangement that is capable of covering at least 50% of the bladder inner surface, more preferably at least 90% of the bladder inner surface and even more preferably at least 99% of the bladder inner surface. Alternatively the bladder wall structure including the plurality of cells (115) can be arranged to at least partially seal a bladder hole or wound. The term "partially seal" means that the bladder wall structure reduces unwanted fluid flow through a bladder hole or wound by at least 50% by volume. In another aspect, the bladder wall structure "substantially seals" a hole or wound in which case it will reduce the amount of fluid flowing from a bladder hole or wound by at least 90% by volume.

FIGS. 2A and 2B are a side view and front view of a portion of a bladder wall structure (119) formed from a plurality of cells (115) that are attached to one another. The plurality of cells (115) can be attached to one another at connections (123) in a manner that causes them to form a liquid impermeable wall. In this aspect, bladder (102) can be made only from the interconnected cells (115) that form bladder wall structure (115). Alternatively, the bladder wall structure (119) can be flexible and either attached to or positioned adjacent to a bladder wall inner surface or outer surface where it can seal bladder holes. In this aspect, bladder (102) will include multiple walls including bladder wall structure (119).

Each cell (115) of bladder wall structure (119) includes one or more stiffened portions (166) and one or more elastic portions (165). In FIG. 2A stiffened portions (166) surround each cell (115) except for portions near the connection points (123) which are elastic portions (166). Fabricating a cell (115) with both stiffened portions and elastic portions can be accomplished in a variety of ways. In one example, cells (115) are made of the same material where the material thickness is greater at the stiffened portions then at the elastic portions. In another example, the stiffened wall portions can be made from a relatively inelastic material while the elastic wall portions can be made from elastic or expandable material with the two material portions being connected to form a cell (115). What is important is that when a pressure or pressure drop acts upon a cell (115), the elastic wall portion expands to cause the cell to grow in the vicinity of the elastic wall portion while, under added pressure, the stiffened wall portions expands less or essentially not at all in comparison to the elastic wall portions.

Figure 3B:
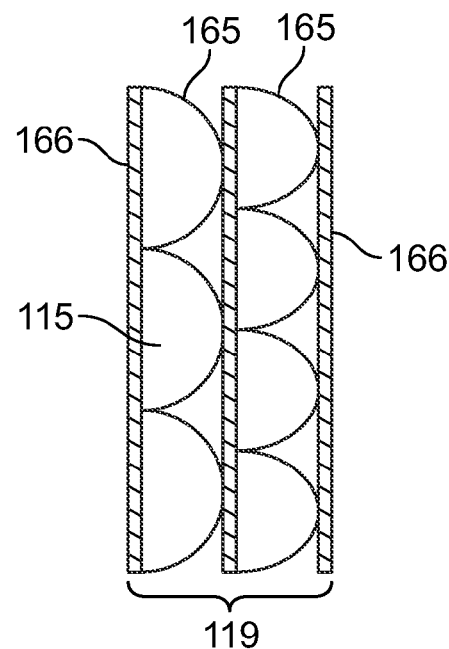
Figure 3C:
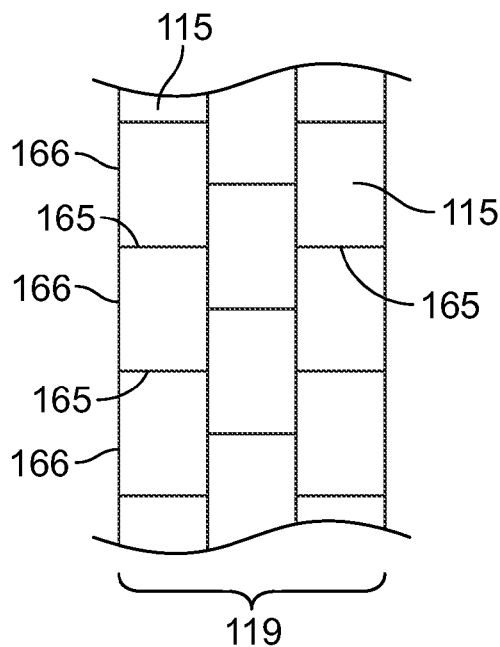
Figure 3D:
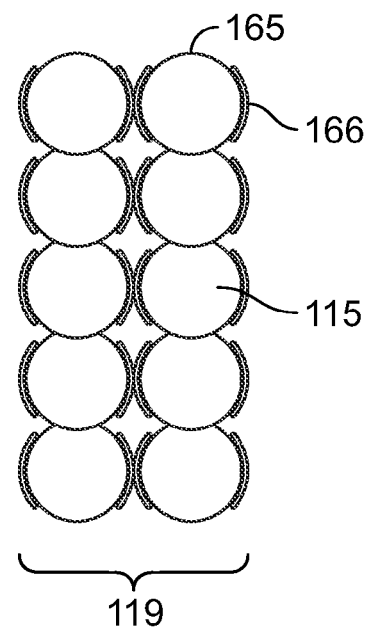

Referring now to FIGS. 3A-3D there are shown non-limiting exemplary embodiments of bladder wall structures (119). Bladder wall structure (119) may be formed of a single layer of cells (115) as shown in FIG. 2A. Alternatively, bladder wall structure (119) may be formed by two or more adjacent layers of cells (115) as shown in FIGS. 3A-3D. Moreover, the shape and arrangement of cells (115) can be varied as can the positioning of elastic portions (165) and stiffened portions (166) in each cell (115).

Referring now to FIGS. 4A-4F there is shown a sequence of schematics, each of side cutaway view of a portion of self-sealing bladder responding to a bladder perforating event. Shown in the figures is a container (100) such as a fuel tank having a wall (101) and an inner self-sealing bladder (102). Bladder (102) includes a plurality of cells (115) defined by first bladder wall (108), second bladder wall (107) and a plurality of partition walls (113) the combination forming a bladder wall structure. First bladder wall (108) and second bladder wall (107) are stiffer than the plurality of partition walls (113). A pressure source (121) is located in each of the plurality of cells (115).

In FIG. 4B a projectile (150) collides with container (100) with sufficient force to forma hole (160) that passes completely through container (100). In FIG. 4C, a fluid leak (170) begins through hole (160). Also in FIG. 4C, pressure source (121) in cells (115') adjacent to hole (160) are activated by the formation of the hole. The pressure source can either begin to pressurize cells (115') or the destruction of the stiffened first bladder wall (108) and second bladder wall (107) around hole (160) can create a pressure drop across partition walls (113'). By either mechanism, the pressure source or pressure differential causes partition walls (113') adjacent to hole (160) to balloon and to migrate towards hole (160). In FIGS. 4D, 4E and 4F, the pressurization of cells (115') continues until, in FIG. 4F, partition walls (113') of intact cells (115') adjacent to hole (160) have ballooned to such an extent that they abut one another and together form seal (180) that essentially plugs hole (160) and inhibits or stops fluid leakage through hole (160). It should be noted that the representation of pressure source (121) in these figures is exemplary and is not intended to limit the scope or operation of the pressure sources described herein.

The sealing of bladder holes caused by a perforation event using the pressure source in the plurality of cells may be enhanced by arranging one or more bladder walls to be stiffer than the plurality of partition walls which expand/balloon when the cell pressure increases. In this aspect, at least one of the bladder first wall (108) and second wall (107) are stiffer than partition walls (113). The term stiffness refers to the ability of a wall to resist bending, moving, or expanding when force, e.g., a differential pressure, is applied across the surface of the wall or across a portion of the wall. Several aspects of bladders including stiffened walls are shown in FIG. 5 where, in the portion of bladder (102) below hole (160) bladder first wall (108) and bladder second wall (107) are stiffer than partition walls (113). In the top portion of bladder (102) above hole (160) in FIG. 5, the bladder first wall (108) and bladder second wall (107) have essentially the same stiffness as partition walls (113). In the top portion, bladder (102) includes a first retaining wall (131) that is associated with bladder first wall (108) and second retaining wall (133) that is associated with bladder second wall (107). Each of the first and second retaining walls is stiffer than partition walls (113) and the first retaining wall and the second retaining wall may have different stiffnesses or non-uniform thicknesses.

First retaining wall (131) and second retaining wall (133) may be associated with bladder first wall (108) and bladder second wall (107) by a variety of methods. In one method, first retaining wall (131) and second retaining wall (133) are adhered to bladder walls (108, 107) with an adhesive material. In another method, the combination of first retaining wall (131) and second retaining wall (133) form a cavity in which the bladder wall structure (119) is placed without attaching the bladder wall structure to the retaining walls. A possible advantage of using stiffened bladder wall portions is that the stiffened wall portions inhibit expansion of cells (115) in directions other than towards hole (160) as shown in FIG. 5.

Stiffened bladder walls may have a variety of designs. For example, a stiffened bladder wall may be made of the same material as a partition wall except that the stiffened bladder wall would be thicker than the partition wall. In another design, reinforcing material such as woven fabrics, sheets and so forth can be incorporated into stiffened walls. In still another design, stiffening strips, corrugations, and so forth can be incorporated into bladder walls to stiffen them.

In another aspect, the bladder wall stiffness can be unequal or asymmetrical where a first bladder wall does not have the same stiffness as a second bladder wall and wherein at least one of the bladder walls is stiffer than stiffness of the plurality of partition walls. FIG. 6 is a bladder having asymmetrically stiffened walls. In FIG. 6, the outside bladder wall—second bladder wall (107) is stiffer than the inside bladder wall—first bladder wall (108). However, the stiffness can be asymmetric in the opposing direction as well with first bladder wall being stiffer than the second bladder wall. The bladder wall asymmetric thickness may further improve hole sealing by inhibiting the expansion of cells (115) towards the outside (or inside) of the container and by directing the expanding elastic partition wall to bulge (175) toward the bladder fluid as shown in FIG. 6.

It is an aspect of this invention that at least one source of pressure is associated with at least one of the plurality of cells. More commonly, each of the plurality of cells may include a source of pressure. The source of pressure may be an active source of pressure—a source of pressure that requires activation by some mechanism upon breach of the bladder, or the source of pressure may be passive pressure source—a pressure source that acts without activation (automatically and immediately) upon breach of the bladder. In either case, the active or passive pressure source causes a partition wall in a cell in which a pressure source is located to expand when the cell adjacent to the partition wall is disrupted by a bladder hole.

Some examples of passive sources of pressure include cells that are pressurized with a gas, fluids, foams, or the like material. In this example, the cells can contain the passive pressure source or the cells can be continuously linked by conduits to a central source of pressure such as a gas cylinder or hydraulic source of pressure. In another example the passive source of pressure may be two part foams or two part gas generating reactants wherein the two ingredients are held in separate chambers in a cell which chambers liberate the ingredients upon a localized impact or strain caused by a nearby bladder hole. Any passive pressure source that can be located in or associated with a cell that is capable of maintaining the cell pressure or adding pressure to a cell may be used.

In one aspect, the passive pressure source is a pressurized cell that has a pressure that at least slightly exceeds the pressure at which the bladder is designed to operate. In this aspect, the stiffened portion of the bladder walls or bladder retaining walls retain the cells in their pressurized form and the plurality of cells will generally be pressurized to the same pressure so that the pressure drop across the partition walls between cells is as close to zero as possible. In this design, when a bladder is breached to form a hole, at least one cell located at the hole will be depressurized. This creates a pressure drop across partition walls of cells immediately adjacent to the hole and the pressure drop urges the flexible partition walls to bulge or balloon towards the hole.

In another aspect, the source of pressure can be an active source of pressure—a source that is activated by some mechanism as a result of the detection of a bladder breach. Some examples of active pressure sources include reactions that are initiated by the bladder fluid filling a bladder breach or controlled cell pressurization. Controlled cell pressurization can be initiated electronically by the detection of a breach such as the electrical activation of a device located in a cell where the device could be, for example, a small pellet of sodium azide or an electrically actuated gas cylinder. The electrical actuation may be "dumb"—for example, actuated by pressure or impact sensors located throughout the bladder where each sensor is associated with one cell or a small array of cells that are simultaneously actuated when a bladder breach is detected. Alternatively, the electrical actuation can be "smart"—for example, a microprocessor that is linked to an array of pressure or impact sensors and an array of pressure sources and that is programmed to identify and locate a bladder hole and to activate pressure sources in cells in the vicinity of the hole.

As noted above, another active source of pressure is a bladder fluid reactive material located in a cell (115) which reacts to cause a partition wall to expand or bulge upon bladder breach. For example, the reactive material can be a material that reacts with bladder fluid or that absorbs bladder fluid. In this aspect, partition wall (113) could be a permeable or semi permeable elastic partition wall that would allow bladder fluid to flow into cell (115) and react with or be absorbed by the reactive material. The reactive material would react in a way that would cause partition (113) to bulge towards the bladder breach. Because partition (113) would be permeable or semi permeable in this aspect, the resulting reaction would be one that produces an expanding solid, semi-solid or foam type material that would not pass through the partition wall but that would nonetheless urge partition (113) to bulge towards the hole.

Another possible source of pressure could be a pressurized canister associated with a pressure control valve. In this aspect, cells (115) would be maintained at a pressure at least slightly greater than the operating pressure of the bladder. A bladder breach would disrupt and depressurize at least one cell (115) which in turn would cause elastic partitions (113) in adjacent intact cells to bulge. The pressure inside the bulging cells would drop prompting the pressure control valve to release additional gas from the cylinder into (115) thereby causing the partition to further bulge and balloon to fill the bladder hole. In this aspect, the pressurized canister can be operated independently by the associated pressure control valve or, alternatively, the canister can be operated by a processor associated with a program that monitors, for example, cell pressure, and the response to a drop in cell pressure by causing a valve associated with canister located in a particular cell to open and pressurize a cell. Similarly, a computer could initiate a chemical reaction using reactants located in a bladder cell.

The bladder cells (115) may have any orientation and geometry that allows bladder partition walls to effectively bulge, swell, balloon or the like to substantially fill bladder breaches and plug bladder holes. Cells (115) are depicted as a single layer of box-like structures. However, cells (115) can assume a variety of alternative useful shapes and geometries. For example, cells (115) can be square, they can be circular, they can be spherical, they can be triangular or they can take on any other three-dimensional shape so long as each cell is associated with one or more elastic partitions (113). Additionally, bladders (102) can include a single layer of cells (115) as shown, for example in FIG. 1 or bladders (102) can include two or more layers (walls) each having a plurality of cells (115).

Partition walls (113) should be made of material that allows them to expand and/or balloon without bursting or failing. In addition, partition walls (113) can be made from a solid bladder liquid impermeable material, they can be made from an osmotic material that is permeable to liquid in the bladder or can be made from an elastic web or netting of material such as a synthetic stocking type material. The choice of bladder material may depend largely upon the choice of pressurization source. If the pressurization source is a gas, then the partition wall may be a gas impermeable material. Some non-limiting examples of partition wall materials include, but are not limited to fluid compatible elastomers natural rubbers such as latex, synthetic rubbers such as silicone rubber, fluorosilicone rubber, neoprene, nitrile rubber, butyl rubbers, Viton, Kalrez, polyurethanes and combinations of layers thereof.

In another aspect, partition walls (113) may include one or more bonding materials. FIG. 7 is a side cut-away view of a bladder portion (102) including a first partition wall (213a) associated with a first bonding material and a second partition wall (213b) associated with a second bonding material. First and second bonding materials may be the same or different materials. Moreover, first in bonding materials may be incorporated into the material used to construct first and second partition walls were first and second bonding materials can be placed in capsules or enclosures associated with the partition walls.

When the first and second bonding materials are the same material, then adjacent partition walls will include the same bonding material. However, when first and second bonding materials are different materials, then adjacent partition walls should include different materials. In this aspect, a single partition wall (213b) will have a first side (220) that includes first bonding material and a second side (222) that includes a second bonding material. This orientation a first and second bonding materials ensures that a ballooning partition wall will move towards an adjacent partition with a complementary bonding material. In one aspect, the bonding material becomes tacky upon contact with liquid in the bladder and allows adjacent expanding partition walls to stick to one another.

FIG. 8 is a schematic of a side-cutaway portion of a bladder wherein a first cell (115') having a ballooned partition wall portion that includes a first side (220) including the first bonding material abuts and becomes adhered to a ballooned partition wall portion that includes a second side (222) having a second bonding material.

In some aspects, it may be useful to prevent cells (115) from being over pressurized when the cell pressure source is activated. Over pressurization could result in damage to the partition wall which in turn could inhibit the ability of the partition wall to form a bladder breach seal. Cell over pressurization may be controlled by incorporating one or more pressure control devices such as pressure disks, pressure relief valves and the like in a cell wall and preferably in bladder first wall or bladder second wall.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A self-sealing liquid bladder comprising:
   a liquid bladder having a bladder wall structure that is impermeable to a liquid in the bladder, and that includes a plurality of connected cells each cell having an elastic wall portion and a stiffened wall portion; and
   at least one source of pressure associated with one or more of the plurality of cells wherein perforation of a cell causes the at least one source of pressure to urge the elastic wall portion of cells adjacent to the perforated cell to expand towards the perforated cell.

2. The self-sealing liquid bladder of claim 1 wherein the plurality of cells are irreversibly connected to one another by one or more connections.

3. The self-sealing liquid bladder of claim 1 wherein each of the plurality of connected cells includes a source of pressure.

4. The self-sealing liquid bladder of claim 1 wherein the plurality of connected cells form a liquid impermeable bladder wall.

5. The self-sealing liquid bladder of claim 1 wherein the bladder wall structure includes two adjacent layers, each layer including a plurality of connected cells wherein each cell has an elastic wall portion, a stiffened wall portion and a source of pressure.

6. The self-sealing liquid bladder of claim 1 wherein the bladder includes a first wall and a second wall spaced apart from the first wall by a plurality of elastic partition walls and at least one partition wall adjacent to each of the first wall and second wall, the combination foiniing a bladder wall structure having a plurality of cells wherein each cell includes a source of pressure.

7. The self-sealing liquid bladder of claim 6 including two or more adjacent layers.

8. The self-sealing liquid bladder of claim 6 wherein at least one of the first wall and the second wall is a stiffened wall portion and wherein each of the plurality of partition walls includes an elastic wall portion.

9. The self-sealing liquid bladder of claim 8 wherein both the first wall and the second wall are stiffer than the elastic wall portion of each of the plurality of partition walls.

10. The self-sealing liquid bladder of claim 8 wherein each of the plurality of partition walls are essentially entirely elastic wall portions.

11. The self-sealing liquid bladder of claim 8 wherein the bladder wall structure is positioned between a first retaining wall and a second retaining wall wherein the second retaining wall is made of a material that is impermeable to liquid in the bladder and wherein liquid in the bladder contacts the second retaining wall.

12. The self-sealing liquid bladder of claim 11 wherein the first retaining wall and second retaining wall are each stiffer than the bladder first wall and the bladder second wall.

13. The self-sealing liquid bladder of claim 11 wherein the first retaining wall and the second retaining wall have different stiffnesses.

14. The self-sealing liquid bladder of claim 11 wherein at least one of the first retaining wall and second retaining wall has a non-uniform thickness.

15. The self-sealing liquid bladder of claim 1 wherein the at least one source of pressure is at least one bladder fluid reactive material.

16. The self-sealing liquid bladder of claim 15 wherein the bladder fluid reactive material is a material that expands upon contact with the bladder fluid.

17. The self-sealing liquid bladder of claim 1 wherein the at least one source of pressure is a passive pressure source.

18. The self-sealing liquid bladder of claim 1 wherein the at least one source of pressure is an active pressure source.

19. The self-sealing liquid bladder of claim 1 wherein at least one of the plurality of cells includes a first chamber holding a first material and a second chamber holding a second material wherein the at least one pressure source is the combination of the first material and the second material.

20. The self-sealing liquid bladder of claim 1 wherein one or more of the plurality of cells include a pressure relief device.

21. A liquid containing bladder self-sealing method comprising the steps of:
   filling a bladder of claim 1 with liquid; and
   perforating at least one cell to activate the at least one source of pressure to urge the elastic wall portion of the at least one cell adjacent to the perforated cell to expand towards the perforated cell.

22. The method of claim 21 wherein two or more cells lie adjacent to the perforated cell and the pressure source in each of two or more adjacent cells are activated by the cell disruption and urge the elastic wall portion of each of the two or more adjacent cells to expand towards the perforated cell.

23. The method of claim 22 wherein the elastic wall portions of each of the two or more adjacent cells expand until a pressure drop across the elastic wall portion approaches zero.

24. The method of claim 21 wherein the pressure source is an active pressure source or a passive pressure source.

25. The method of claim 21 wherein the disruption of the at least one cell causes liquid in the bladder to pass through the wall of the at least one adjacent cell and contact a material inside the at least one cell that expands upon contact with the liquid in the bladder to cause the elastic wall portion to expand towards the perforated cell.

26. The method of claim 21 wherein the pressure source is gas retained in each cell at a pressure that is greater than the operating pressure of the bladder.

* * * * *